United States Patent Office 3,166,529
Patented Jan. 19, 1965

3,166,529
LIGHT STABILIZED, POLY-α-OLEFIN PLASTIC COMPOSITION
Gordon C. Newland and John W. Tamblyn, Kingsport, Tenn., assignors to Eastman Kodak Company, Rochester, N.Y., a corporation of New Jersey
No Drawing. Filed Dec. 28, 1961, Ser. No. 162,963
1 Claim. (Cl. 260—45.8)

This invention relates generally to poly-α-olefin polymers and particularly to the problem of stabilizing them relative to the degradative effects of light.

Normally solid poly-α-olefin polymers such as the well known normally solid polyethylene and polypropylene polymers (commonly referred to merely as polyethylene and polypropylene) are thermoplastic, synthetic resins which have gained widespread use as materials of construction. However, as is also well known, normally solid poly-α-olefin polymers undergo photochemical degradation when exposed to sunlight, particularly ultraviolet light, and air. This effect is frequently termed weathering. It appears to be a photo-oxidation process which causes rupture of the polymer chains and formation of carbonyl (=C=O) groups. As this degradation progresses, articles manufactured from these polymers tend to crack, become brittle and lose tensile strength to the extent of mechanical failure.

A general object of this invention is to provide a poly-α-olefin plastic composition wherein the poly-α-olefin polymeric component thereof is stabilized relative to the degradation effects of light.

A specific object of this invention is to provide a poly-α-olefin plastic composition comprising an additive effective to stabilize the poly-α-olefin polymeric component of the composition against degradation by ultraviolet light.

These objects and others are achieved by this invention which is based on our discovery that the introduction of one or more nitro groups into aromatic organic chemical compounds at certain positions in their molecules converts particular ones of these compounds, but not all aromatic organic chemical compounds, into effective light stabilizers for poly-α-olefin polymers and causes others of these compounds to be substantially and dramatically enhanced in their light stabilization effects on poly-α-olefin polymers.

In summary, this invention comprises a poly-α-olefin plastic composition consisting essentially of (1) a normally solid poly-α-olefin polymer component and (2) an aromatic nitro compound that is a member of the group consisting of 1,3,5-trinitrobenzene,
2-(2,4-dinitrobenzyl)pyridine,
4-(β-hydroxyethoxy)-β-nitrostyrene,
5-(p-nitrobenzylidene)-3-phenyl-2-phenylimino-4-thiazolidinone,
3,5-dinitroveratrol,
4-(o-nitrophenyl)-4-hydroxy-2-butanone,
2,4-dihydroxybenzophenone-2'-4'-dinitrophenylhydrazone,
N,N-di(o-nitrobenzylidene)-p-phenylenediamine,
3,4,5-trinitroveratrol,
2-(4'-nitroanilino)benzothiazole,
Salicylaldehyde-2',4'-dinitrophenylhydrazone,
4,4'-dinitrostilbene,
4,7-dibromo-5-nitro-2,1,3-benzothiadiazole,
Benzaldehyde-2',4'-dinitrophenylhydrazone,
4-(p-anisidino)-7-bromo-5-nitro-2,1,3-benzothiadiazole,
2-nitrobenzylidene-p-anisidine,
1,6-dihydroxy-4,5-dinitroanthraquinone,
4,8-dinitroanthrarufin,
1-hydroxy-5-nitroanthraquinone,
1,7-dihydroxy-4,8-dinitroanthraquinone,
6-nitropiperonal-p-toluidine and
1-hydroxy-8-nitroanthraquinone.

Certain ones of the aromatic nitro compounds in this group compared to others in the group are vastly superior light stabilizers for poly-α-olefin polymers. Consequently, this invention in its more specific aspects comprises a light stabilized, poly-α-olefin plastic composition consisting essentially of a poly-α-olefin polymeric component and an aromatic nitro compound selected from the preferred group consisting of 2-(4'-nitroanilino)benzothiazole,
Salicylaldehyde-2',4'-dinitrophenylhydrazone,
4,4'-dinitrostilbene,
4,7-dibromo-5-nitro-2,1,3-benzothiadizole,
Benzaldehyde-2',4'-dinitrophenylhydrazone,
4-(p-anisidino)-7-bromo-5-nitro-2,1,3-benzothiadizole,
2-nitrobenzylidene-p-anisidine,
1,6-dihydroxy-4,5-dinitroanthraquinone,
4,8-dinitroanthrarufin,
1-hydroxy-5-nitroanthraquinone,
1,7-dihydroxy-4,8-dinitroanthraquinone,
6-nitropiperonal-p-toluidine and
1-hydroxy-8-nitroanthraquinone.

The poly-α-olefin polymeric component of the plastic composition of this invention is one of, or a blend of, high or low density, normally solid, homopolymers or copolymers of α-monoolefinic aliphatic hydrocarbons having generally 2–10 carbon atoms, preferably 2–6 carbon atoms, and in the more specific aspects of this invention, 2–3 carbon atoms. Examples of such poly-α-olefin polymers are the homopolymers and the copolymers of ethylene, propylene, butene-1, isobutylene, pentene-1, 2-butene-1, 2-methylbutene-1, 3-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1, copolymers of propylene and 1-butene, and the like. Processes for preparing these polymers are well known, being described in detail, for example, in the U.S. patent, No. 2,912,424, of Cash, the U.S. patent No. 2,917,500, of Hagemeyer et al., and other publications. In general, the normally solid poly-α-olefin polymers of this invention are thermoplastic, light unstable compounds having average molecular weights of at least about nine thousand. In the average molecular weight range from about nine thousand to about twelve thousand the normally solid poly-α-olefin polymers generally are wax-like at room temperature while above an average molecular weight of about twelve thousand these normally solid polymers have greater consistencies and hardness.

Concentration of the aromatic nitro compound in the poly-α-olefin plastic composition of this invention is at an effective light stabilization value. This value in general depends upon the extent of light stabilization desired upon many variables, including the intended end use of the poly-α-olefin plastic composition. However, for most purposes concentration in a range from about 0.1 to about 10% by weight of the poly-α-olefin polymeric component gives satisfactory results.

The plastic composition of this invention is prepared by incorporating an aromatic nitro compound of this invention into the poly-α-olefin polymeric component. Generally such incorporation is performed by any one of a number of well-known methods, such as roll compounding, extrusion, solvent mixing and the like. For example, such incorporation can be performed by heating or otherwise softening the poly-α-olefin polymeric component to a workable consistency and then working in as by roll compounding the aromatic nitro compound of this invention until a substantially uniform mixture or dispersion is obtained.

The resulting poly-α-olefin composition of this invention is then usually cast or molded, for example, into articles such as pellets, sheeting, films, bars, filaments, and the like as by conventional casting and molding techniques which include extrusion, blow molding and the like.

This invention is further illustrated by the following examples of various aspects thereof including specific embodiments. Unless otherwise indicated this invention is not limited to these specific embodiments.

EXAMPLE 1

This example illustrates various specific embodiments of the polyethylene plastic composition of this invention, their preparation and typical light stability results obtained on the testing thereof.

Relative to each one of the aromatic nitro compounds listed in the Additive column of the following Table I, admix 1 part by weight of the aromatic nitro compound and 100 parts by weight of a conventional, low density polyethylene of melt index 2 on hot compounding rolls for 4 minutes, the front roll being at 270° F. and the rear roll at 220° F. Compression mold the resulting roll mix into flat plates 60 mils thick. Cut test specimens from these plates. Determine the carbonyl content of these test specimens by infrared absorption measurement at 5.82 microns. Then expose the test specimens outdoors for three months. At the end of the three months' exposure period, again determine the carbonyl content of the test specimens by infrared absorption measurement at 5.82 microns.

At the same time as the foregoing procedures are performed, work for 4 minutes 100 parts by weight of the same, conventional, low density polyethylene of melt index 2 on the hot compounding rolls with the front roll being held at 270° F. and the rear roll at 220° F. Then compression mold the polyethylene into flat plates 60 mils thick, cut test specimens from these plates, determine by infrared absorption at 5.82 microns the carbonyl content of the test specimens and then expose the test specimens outdoors concurrently with the test specimens of polyethylene containing additives.

Typical results as ascertained by exposure of test specimens outdoors at Kingsport, Tennessee, are indicated in the following Table I.

*Table I*

| Additive | Increase in Arbitrary Units of Carbonyl Content After 3 Months' Outdoor Exposure |
| --- | --- |
| None | 37.0 |
| 4-(β-hydroxyethoxy)-β-nitrostyrene | 36.0 |
| 2-(2,4-dinitrobenzyl)pyridine | 35.0 |
| 1,3,5-trinitrobenzene | 28.0 |
| 5-(p-nitrobenzylidene)-3-phenyl-2-phenylimino-4-thiazolidinone | 24.3 |
| 3,5-dinitroveratrol | 17.7 |
| 4-(o-nitrophenyl)4-hydroxy-2-butanone | 14.5 |
| 3,4,5-trinitroveratrol | 8.2 |
| N,N'-di(o-nitrobenzylidene)-p-phenylenediamine | 8.0 |
| 4,4'-dinitrostilbene | 5.0 |
| 2-nitrobenzylidene-p-anisidine | 2.1 |
| 6-nitropiperonal-p-toluidine | 0.9 |

These typical results show that while each one of the aromatic nitro compounds of Table I is an effective, light stabilizer for conventional polyethylene, certain ones, namely: 4,4'-dinitrostilbene, 2-nitrobenzylidene-p-anisidine and 6-nitropiperonal-p-toluidine, are much superior in light stabilization effect compared to the others. Hence, these particular aromatic nitro compounds form part of a preferred group of aromatic nitro compounds under the concepts of this invention.

EXAMPLE 2

This example illustrates still other specific embodiments of the polyethylene plastic composition of this invention, their preparation and light stability testing thereof.

Relative to each one of the aromatic nitro compounds listed in the Additive column of the following Table II, roll compound 1 part by weight of the aromatic nitro compound into 100 parts by weight of a conventional polyethylene of 0.92 density. The milling time is 4 minutes with the rear roll being held at 220° F. and the front roll at 270° F. Compression mold the resulting roll mix into flat plates 0.048 inch thick. Expose the plates outdoors for 60 days. Then measure by infrared absorption at 5.82 microns the carbonyl content of the plates.

At the same time as the foregoing procedures are performed, work for 4 minutes on the hot compounding rolls 100 parts by weight of the polyethylene just described. Do not mix in an additive. Again, the front roll is held at 270° F. and the rear roll is kept at 220° F. Then compression mold the polyethylene into a flat plate 0.048 inch thick. Concurrently expose this plate for 60 days along with the others and also, at the end of this time, determine by infrared absorption at 5.82 microns the carbonyl content of the plate.

Typical results obtained in exposing plates made and tested in accordance with the foregoing are indicated in the following Table II.

*Table II*

| Additive | Carbonyl Content After 60 Days' Outdoor Exposure |
| --- | --- |
| None | 20 |
| 1,3,5-trinitrobenzene | 12 |
| 4,8-dinitroanthrarufin | 6 |

These typical results demonstrate that the two aromatic nitro compounds of Table II are effective light stabilizers for conventional polyethylene. In addition, these results show that 4,8-dinitroanthrarufin is much more effective than 1,3,5-trinitrobenzene in stabilizing conventional polyethylene relative to ultraviolet light. Hence, 4,8-dinitroanthrarufin is a preferred aromatic nitro compound of this invention.

EXAMPLE 3

This example illustrates various specific embodiments of the polypropylene plastic composition of this invention, their preparation and typical light stability results obtained on the testing thereof.

Relative to each aromatic nitro compound in the Additive column in the following Table III, dissolve in the solvent: 1,2,3,4-tetrahydronaphthalene, more commonly referred to as tetralin, 5 parts by weight of the aromatic nitro compound and 95 parts by weight of a conventional polypropylene having a density of 0.90. A "dope" of the polypropylene polymer is thereby formed. Cast the dope as a film of about 3 mils (0.003 inch) thickness and remove the solvent therefrom by evaporation.

At the same time, dissolve in tetralin 100 parts by weight of the same polypropylene, forming thereby a dope of the polymer without an additive. Cast the dope as a film of about 3 mils thickness and remove the solvent therefrom by evaporation.

Cut out test specimens from the film of polymer without an additive and the films of polymer with additives. Expose these test specimens until they become brittle in an Atlas Twin-Arc Weather-Ometer modified by the addition of ten 20-watt Westinghouse fluorescent sun lamps. The state of brittleness is deemed to be reached when the film specimen breaks on one hard crease with the exposed side of the film on the outside of the crease.

On the basis of these accelerated exposure tests determine the stabilization rating of each polypropylene composition, and thus of the corresponding additive involved. Stabilization rating is the ratio of the exposure time required for the development of brittleness in the film with additive to the exposure time required for the development of brittleness in the film without an additive.

Typical stabilization ratings of these polypropylene plastic compositions and thus of the additives are shown in the following Table III.

Table III

| Additive | Stabilization Rating |
|---|---|
| None | 1 |
| 2,4-dihydroxybenzophenone-2',4'-dinitrophenylhydrazone | 4 |
| 2-(4'-nitroanilino)benzothiazole | 6 |
| Salicylaldehyde-2',4'-dinitrophenylhydrazone | 7 |
| 4,7-dibromo-5-nitro-2,1,3-benzothiadiazole | 9 |
| Benzaldehyde-2; 4'-dinitrophenylhydrazone | 10 |
| 4-(p-anisidine)-7-bromo-5-nitro-2,1,3-benzothiadiazole | 11 |
| 1,6-dihydroxy-4,5-dinitroanthraquinone | 16 |
| 4,8-dinitroanthrarufin | 21 |
| 1-hydroxy-5-nitroanthraquinone | 26 |
| 1,7-dihydroxy-4,8-dinitroanthraquinone | 28 |
| 1-hydroxy-8-nitroanthraquinone | 44 |

The typical stabilization ratings of Table III evidence that each one of the aromatic nitro compounds effectively stabilize convention polypropylene relative to light. These ratings also show that all of the aromatic nitro compounds in Table III, except 2,4-dihydroxybenzophenone-2',4'-dinitrophenylhydrazone, are in the preferred group of aromatic nitro compounds under the concepts of this invention.

EXAMPLE 4

This example illustrates other specific embodiments of the poly-α-olefin plastic composition of this invention, their preparation and typical results obtained in testing their light stability.

Prepare a 4% dope of each of the poly-α-olefin polymeric compounds set forth in the following Table IV. Do this by admixing the polymeric compound and tetralin at a weight ratio of 1:24. Divide the dope in each case into 4 equal portions. To three of the portions in each case add one of the aromatic nitro compounds which are listed in the Additive column of Table IV, at a weight ratio to the poly-α-olefin polymeric compound in the portion of 1:20 (which represents about 5% by weight of the poly-α-olefin polymeric compound). Then, in each case stir each one of the four portions for 1 hour at 145° C. At the end of this time cast each portion on a ferrotype plate at a temperature of about 143° C. and allow the tetralin to evaporate to give a film 0.003 inch thick. Usually about 10 minutes is needed to obtain complete evaporation. Quench the resulting film in cold water and then peel it from the ferrotype plate.

Cut a test specimen 2.5 inches x 0.5 inch from each film. Expose the test specimens to artificial weathering in an Atlas Twin-Arc Weather-Ometer modified as in the preceding Examples and determine thereby the exposure time required for them to become brittle.

Typical exposure times required for the test specimens to become brittle are given in Table IV.

Table IV

| Additive | Exposure Time in Hours Required For Embrittlement | | | |
|---|---|---|---|---|
| | Polypropylene | Poly(4-methyl-pentene-1) | Poly(3-methyl-pentene-1) | 80/20 Propylene/1-butene Copolymer |
| None | 23 | 16 | 19 | 22 |
| Salicylaldehyde-2',4'-dinitrophenylhydrazone | 160 | 36 | 47 | 160 |
| 4-(p-anisidino-7-bromo-5-nitro-2,1,3-benzothiazole | 250 | 48 | 60 | 250 |
| 4,8-dinitroanthrarufin | 483 | 96 | 114 | 440 |

These typical data show that the aromatic nitro compounds of this invention are effective light stabilizers for the poly-α-olefin polymeric compounds of this invention.

Thus, there is provided a poly-α-olefin plastic composition wherein a normally light-unstable poly-α-olefin polymeric component is light stabilized by an aromatic nitro compound of this invention.

Other features, advantages and embodiments of this invention will be apparent to those in the exercise of ordinary skill in the art after reading the foregoing disclosure. All embodiments of this invention including variations and modifications thereof embracing the spirit and essential characteristics of this invention are included within the scope of the claimed subject matter unless expressly excluded by claim language.

We claim:

A light stabilized plastic composition consisting essentially of a normally solid, normally light unstable, and polypropylene at an effective light stabilizing concentration an aromatic nitro compound that is a member of the group consisting of 1,3,5-trinitrobenzene,
2-(2,4-dinitrobenzyl)pyridine,
4-(β-hydroxyethoxy)-β-nitrostyrene,
5-(p-nitrobenzylidene)-3-phenyl-2-phenylimino-4-thiazolidinone,
3,5-dinitroveratrol,
4-(o-nitrophenyl)-4-hydroxy-2-butanone,
2,4-dihydroxybenzophenone-2',4'-dinitrophenylhydrazone,
N,N-di(o-nitrobenzylidene)-p-phenylenediamine,
3,4,5-trinitroveratrol,
2-(4'-nitroanilino)benzothiazole,
Salicylaldehyde-2',4'-dinitrophenylhydrazone,
4,4'-dinitrostilbene,
4,7-dibromo-5-nitro-2,1,3-benzothiadiazole,
Benzaldehyde-2',4'-dinitrophenylhydrazone,
4-(p-anisidino)-7-bromo-5-nitro-2,1,3-benzothiadiazole,
2-nitrobenzylidene-p-anisidine and
6-nitropiperonal-p-toluidine.

References Cited in the file of this patent
UNITED STATES PATENTS
3,010,939    Dinsberg _____ Nov. 28, 1961